(12) United States Patent
Augsburger et al.

(10) Patent No.: US 10,468,884 B2
(45) Date of Patent: Nov. 5, 2019

(54) DEVICE AND METHOD FOR CONTROLLING A LOAD FLOW IN AN ALTERNATING-VOLTAGE NETWORK

(71) Applicant: SIEMENS AKTIENGESELLSCHAFT, Munich (DE)

(72) Inventors: Friedemann Augsburger, Altdorf (DE); Dominik Ergin, Baiersdorf (DE); Hans-Joachim Knaak, Erlangen (DE); Andreas Philipp, Winkelhaid (DE); Jochen Schaefer, Kersbach (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 15/780,653

(22) PCT Filed: Dec. 14, 2015

(86) PCT No.: PCT/EP2015/079546
§ 371 (c)(1),
(2) Date: Jun. 1, 2018

(87) PCT Pub. No.: WO2017/101963
PCT Pub. Date: Jun. 22, 2017

(65) Prior Publication Data
US 2018/0358808 A1    Dec. 13, 2018

(51) Int. Cl.
*H02M 5/44*   (2006.01)
*H02J 3/18*   (2006.01)
*H02J 3/26*   (2006.01)

(52) U.S. Cl.
CPC .............. *H02J 3/1814* (2013.01); *H02J 3/26* (2013.01); *H02M 5/44* (2013.01); *Y02E 40/18* (2013.01); *Y02E 40/50* (2013.01)

(58) Field of Classification Search
CPC ....... H02J 3/36; H02J 2003/365; H02J 3/1814
(Continued)

(56) References Cited

U.S. PATENT DOCUMENTS 3,955,133 A   5/1976  Schroder et al.
9,774,187 B2  9/2017  Eckel
(Continued)

FOREIGN PATENT DOCUMENTS

FR      2232857 A1    1/1975
WO   2013087110 A1    6/2013
(Continued)

*Primary Examiner* — Alex Torres-Rivera
(74) *Attorney, Agent, or Firm* — Laurence Greenberg; Werner Stemer; Ralph Locher

(57) ABSTRACT

A device controls a load flow in an alternating-voltage network. The device is distinguished by a module series circuit of two-pole switching modules that can be inserted in series into a phase line of the alternating-voltage network. Each switching module has an energy store and controllable power semiconductors that can be switched on an off and each switching module can be controlled in such a way that a switching-module voltage can be produced at the poles thereof, which switching-module voltage corresponds to a positive or negative energy-store voltage or a voltage having the value of zero. A control apparatus for controlling the switching modules is provided, which control apparatus is configured to control the switching modules in such a way that a periodic longitudinal voltage can be produced at the module series circuit. A method for controlling a load flow in an alternating-voltage network is performed by the device.

12 Claims, 4 Drawing Sheets

(58) Field of Classification Search
USPC .................................................. 363/35, 37
See application file for complete search history.

(56) References Cited

U.S. PATENT DOCUMENTS

| | | | |
|---|---|---|---|
| 9,853,537 B2 | 12/2017 | Mueller et al. | |
| 2014/0226377 A1* | 8/2014 | Goetz | H02M 3/158 363/65 |
| 2014/0362618 A1* | 12/2014 | Hassan | H02J 3/1857 363/35 |
| 2015/0069980 A1* | 3/2015 | Gambach | H02M 1/12 323/207 |

FOREIGN PATENT DOCUMENTS

| | | | | |
|---|---|---|---|---|
| WO | WO-2013087110 A1 * | 6/2013 | | H02M 1/12 |
| WO | 2013189525 A1 | 12/2013 | | |
| WO | 2013189526 A1 | 12/2013 | | |
| WO | 2014127829 A1 | 8/2014 | | |
| WO | 2015003737 A1 | 1/2015 | | |

* cited by examiner

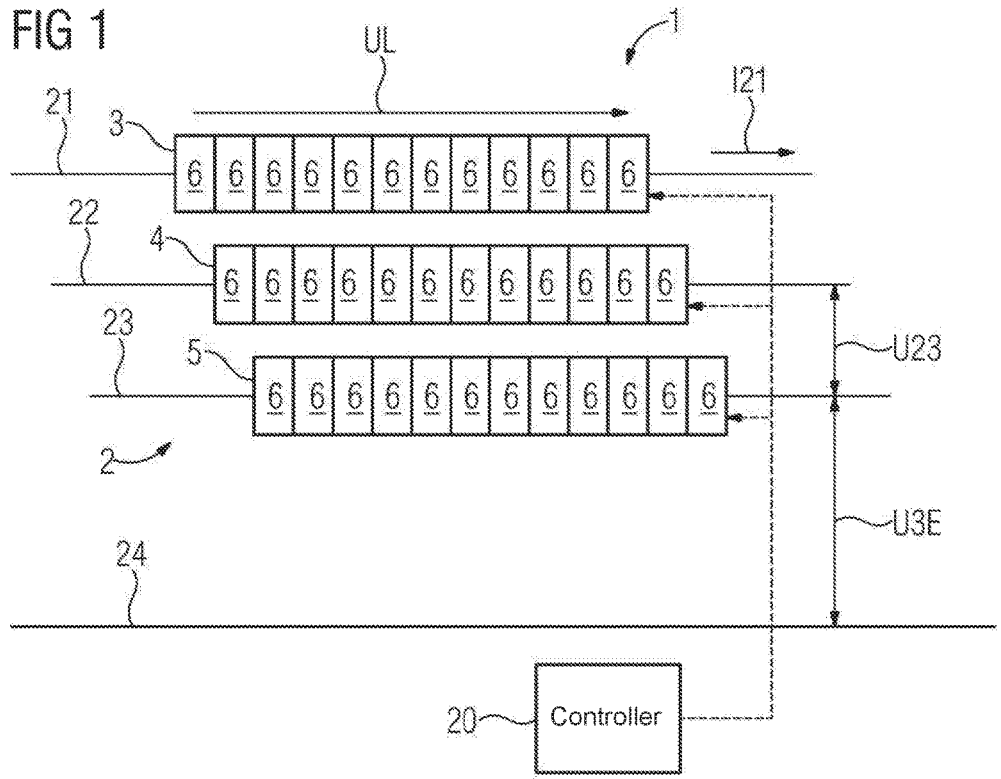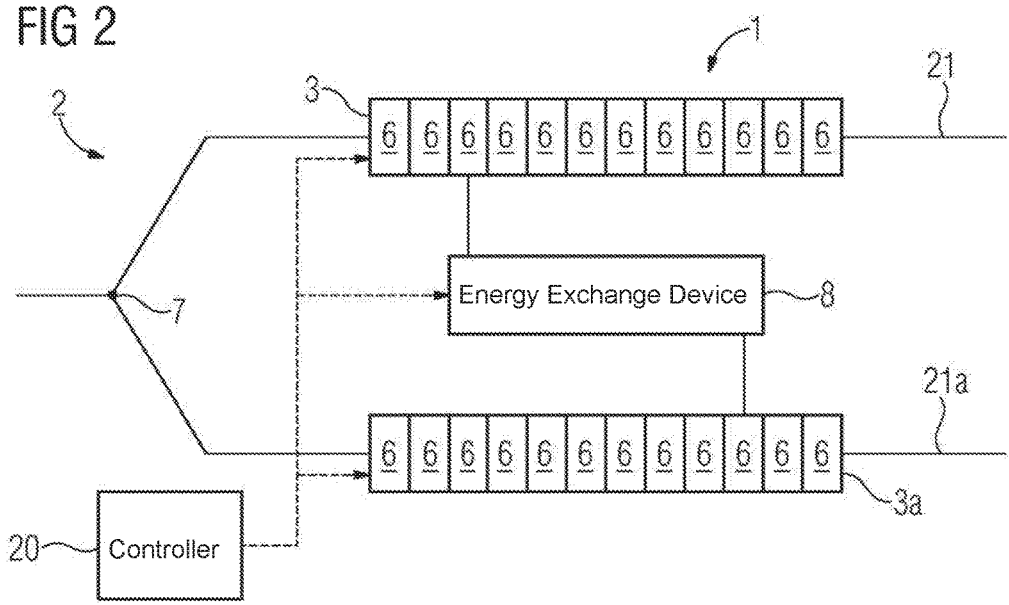

DEVICE AND METHOD FOR CONTROLLING A LOAD FLOW IN AN ALTERNATING-VOLTAGE NETWORK

BACKGROUND OF THE INVENTION

Field of the Invention

The invention relates to a device for controlling a load flow in an alternating-voltage network.

In an alternating-voltage network, in particular a branched or an intermeshed alternating-voltage network, it is often necessary to adjust the load flow in such a manner that an operating current flowing in the alternating-voltage network is distributed as uniformly as possible to parallel lines of the alternating-voltage network. This is motivated, in particular, by the square-law dependence of the ohmic losses on the current, by virtue of which the efficiency of the transmission of energy is also crucially influenced. In addition, in alternating-voltage networks the generation of reactive power and the dissipation of reactive power have to be controlled. Within the context of the increasing amounts of energy to be transmitted by reason of the intensified exploitation of regenerative energy-sources, the optimal utilization of the existing alternating-voltage networks is assuming distinctly greater significance.

Devices for controlling the load flow are known from the state of the art, in particular as reactive-power compensation systems. For instance, in the case of the so-called Fixed Series Compensation (FSC), use is made of capacitors serially inserted into an alternating-voltage line of the alternating-voltage network.

Furthermore, static reactive-power compensators are known which include converters arranged parallel to the alternating-voltage line. For instance, printed publication WO 2013/087110 A1 presents a converter with three phase branches which are connected to one another in a delta circuit. Each phase branch exhibits a connection-point for connection to a phase, assigned to it, of a three-phase alternating-voltage network. In this case the phase branches are each connected to the assigned phases of the alternating-voltage network via coupling inductors. Each phase branch exhibits a phase module with a series connection of bipolar submodules, said submodules taking the form of so-called full-bridge circuits. Each submodule accordingly comprises two series connections, connected parallel to one another, of power-semiconductor switching units, each power-semiconductor switching unit comprising a disconnectable power semiconductor and also a diode antiparallel thereto. Furthermore, each submodule exhibits an energy-storage device, connected parallel to the two series connections, in the form of a capacitor. Each submodule can be driven in such a manner that at its poles a voltage drops that corresponds to an energy-storage voltage—that is to say, the voltage of the capacitor, to the energy-storage voltage but with reversed polarity, or to a zero voltage—that is to say, a voltage having the value zero. Hence by means of suitable drive of the submodules a step-like alternating voltage can be generated at the phase modules of the converter. The individual step height corresponds in this case to the capacitor voltage. Furthermore, the known converter includes a regulating device for regulating the currents in the phase branches of the converter, so that a desired inductive reactive power can be made available in the alternating-voltage network.

SUMMARY OF THE INVENTION

An object of the invention is to propose a device of the aforementioned type that permits a load-flow control in the alternating-voltage network that is as fast and reliable as possible.

This object is achieved in the case of a device according to this type by a modular series connection of bipolar switching modules that is capable of being serially inserted into a phase line of the alternating-voltage network, wherein each switching module exhibits an energy-storage device and also power semiconductors that are capable of being driven and capable of being switched on and off, and is capable of being driven in such a manner that at its poles a switching-module voltage can be generated that corresponds to a positive or negative energy-storage voltage or to a voltage having the value zero, and a control device for driving the switching modules, which has been set up to drive the switching modules in such a manner that a periodic longitudinal voltage can be generated at the modular series connection.

By a "longitudinal voltage" (direct-axis voltage) may be understood a voltage that is applied along a power supply line or along a section of a power supply line. In particular, a longitudinal voltage may be a voltage between two connectors of the modular series connection. The modular series connection in this case is of bipolar design, so that the entire phase current flowing in the phase line also flows through the device according to the invention.

With the device according to the invention, a fast and substantially continuously adjustable source of longitudinal voltage for an alternating-voltage network is made available. Since in comparison with a parallel compensation merely relatively low voltages have to be serially fed into the alternating-voltage network in order to influence the load flow effectively, a lowering of the costs of the load-flow control can advantageously be achieved.

Over and above this, in addition to a fundamental oscillation also harmonics of the voltage or of the current can be influenced advantageously by means of the device according to the invention. Hence instabilities arising can be damped quickly. In addition, energy can be withdrawn from certain harmonics or transient processes in the alternating-voltage network and can be fed back into the alternating-voltage network at a different, non-critical frequency.

By means of the device according to the invention, a longitudinal voltage of a predetermined frequency and phase can be generated. In this case, the energy from the alternating-voltage network is temporarily stored in the energy-storage devices of the switching modules. Therefore the device can firstly feed reactive power into the alternating-voltage network, whereby a short-term feed of active power is likewise possible.

For the purpose of generating the periodic longitudinal voltage, the control device controls the switching modules, or the power semiconductors of the switching modules, in such a way, for instance, that a polarity of the switching-module voltage changes in a predetermined temporal sequence. Since all the power semiconductors of all the switching modules can in principle be switched independently of one another, a longitudinal voltage of arbitrary phase and frequency can consequently be generated.

The longitudinal voltage to be impressed for the purpose of effectively influencing the load flow is relatively low compared to a transverse voltage (quadrature-axis voltage) that has to be fed in by means of installations linked in parallel. For instance, longitudinal voltages of 1 kV to 50 kV at a transmission voltage of over 100 kV in the alternating-voltage network may already be sufficient.

In the case of a polyphase alternating-voltage network, each of the phase lines is preferably equipped with a modular series connection assigned to it.

An active-power feed over a longer time can be achieved if a transmission of energy between a plurality of the modular series connections is made possible. According to a preferred embodiment of the invention, the device further includes a further modular series connection of the bipolar switching modules, which can be inserted into an outgoing line of the alternating-voltage network which is connected to the phase line, and by means of which a longitudinal voltage can be generated, and also an energy-exchange device which is connected to the modular series connection and to the further modular series connection and which has been set up for the exchange of electrical energy between the phase line and the outgoing line. Accordingly, at a node of the alternating-voltage network the energy can be exchanged between the nodal branches of said network, namely the phase line and at least one further nodal branch which is also designated as an outgoing line. Since the phase line and the outgoing line are substantially at the same electrical potential, an exchange of energy between them is easier to carry out than, for instance, an exchange of energy between the alternating-voltage network and an energy-source at ground potential.

However, in principle it is also conceivable that the modular series connection is assigned to a first phase line, and the further modular series connection is assigned to a second phase line assigned to a further phase of a polyphase alternating-voltage network, and an exchange of energy between the first and the second phase line can be carried out by means of the energy-exchange device.

The energy-exchange device preferentially includes a first inverter, which is connected on the direct-voltage side to the energy-storage device of at least one of the switching modules of the modular series connection, and on the alternating-voltage side to a busbar, and a second inverter, which is connected on the direct-voltage side to the energy-storage device of at least one of the switching modules of the further modular series connection, and on the alternating-voltage side to the busbar. The energy to be exchanged is accordingly withdrawn from the direct-voltage-side intermediate circuit of the switching module and supplied to the direct-voltage-side intermediate circuit of the switching module of the further modular series connection. It is moreover conceivable that several or even all of the switching modules of the modular series connection and/or of the further modular series connection are connected to the busbar via inverters assigned to them. This permits a particularly efficient transmission of energy between the modular series connections.

The first and the second inverter are preferentially each connected to the busbar via a transformer. As a result, a separation of potential between the switching modules is advantageously achieved.

According to one embodiment of the invention, the busbar is connected to a further alternating-voltage network via an additional transformer. In this way, additionally needed or excess active power can be exchanged with the further alternating-voltage network.

According to a further embodiment, the energy-exchange device includes at least one energy-exchange branch in which a series connection of bipolar exchange modules is arranged, wherein each exchange module exhibits an energy-storage device and also power semiconductors that are capable of being driven and capable of being switched on and off, and is capable of being driven in such a manner that at its poles an exchange-module voltage can be generated that corresponds to a positive or negative energy-storage voltage or to a voltage having the value zero. With the aid of a suitable drive of the power semiconductors of the exchange modules, an exchange of energy between the modular series connections or the phase line and the outgoing line can be obtained. In this case, provision of a transformer can advantageously be dispensed with.

According to an advantageous embodiment of the invention, a plurality of additional modular series connections of the bipolar switching modules are provided, which can each be inserted into additional outgoing lines assigned to them and connected to the phase line, wherein the energy-exchange device is connected to the additional modular series connections and has been set up for the exchange of energy between the phase line, the outgoing line and the additional outgoing lines. The energy-exchange device may in this case exhibit several energy-exchange branches which each extend between two lines from the set comprising the phase line, the outgoing line and the additional outgoing lines, and enable the exchange of energy. In this way, a load-flow control at a node of the alternating-voltage network exhibiting a plurality of outgoing lines can be realized, in which case active power can also be fed permanently into individual outgoing lines or the phase line.

The exchange of energy between the phase line and the outgoing lines can be realized by means of a circulating current which flows in the energy-exchange branches.

According to one embodiment of the invention, the energy-exchange branches between the phase line and the outgoing lines form a ring structure and/or a star structure. The ring structure or star structure may comprise several meshes which are constituted by the energy-exchange branches, by a section of the phase line and/or by sections of the outgoing lines. In these meshes at least one circulating current can be generated by appropriate drive of the switching modules or of the power semiconductors of the switching modules, so that an exchange of energy or of active power takes place.

The device according to the invention has preferentially been set up for controlling the load flow in a polyphase, for instance three-phase, alternating-voltage network.

It may be an advantage if the switching modules take the form of full-bridge circuits. A full-bridge circuit is described in WO 2013/087110 A1, for instance.

It is likewise possible to design the switching modules as two oppositely-directed half-bridge circuits. A half-bridge circuit is known from DE 101 03 031 B4, for instance.

However, it is of course likewise conceivable that the modular series connection exhibits further bipolar elements which are switched into the phase line or into the outgoing lines, forming a series connection jointly with the sub modules.

The invention further relates to a method for controlling a load flow in an alternating-voltage network.

An object of the invention consists in specifying such a method that can be carried out as easily as possible and is reliable.

This object is achieved by a method in which, by means of a control device, switching modules of a modular series connection which has been inserted into a phase line of the alternating-voltage network, wherein each switching module exhibits an energy-storage device and also power semiconductors that are capable of being driven and capable of being switched on and off, and is capable of being driven in such a manner that at its poles a switching-module voltage can be generated that corresponds to a positive or negative energy-storage voltage or to a voltage having the value zero, are driven in such a manner that a periodic longitudinal voltage is generated at the modular series connection.

The advantages of the method according to the invention correspond to the advantages described in connection with the device according to the invention.

According to one embodiment of the method, switching modules of a further modular series connection, which has been inserted into an outgoing line of the alternating-voltage network, are driven by means of the control device in such a manner that a longitudinal voltage is generated at the further modular series connection, electrical energy being exchanged between the phase line and the outgoing line by means of an energy-exchange device connected to the two modular series connections. Hence an active power can also be permanently fed into the phase line or into the outgoing line. The invention will furthermore be elucidated in greater detail on the basis of embodiment examples in FIGS. 1 to 6.

BRIEF DESCRIPTION OF THE SEVERAL VIEWS OF THE DRAWING

FIG. 1 shows a first embodiment example of the device according to the invention in schematic representation;

FIG. 2 shows a second embodiment example of the device according to the invention in schematic representation;

DESCRIPTION OF THE INVENTION

Figure 3:
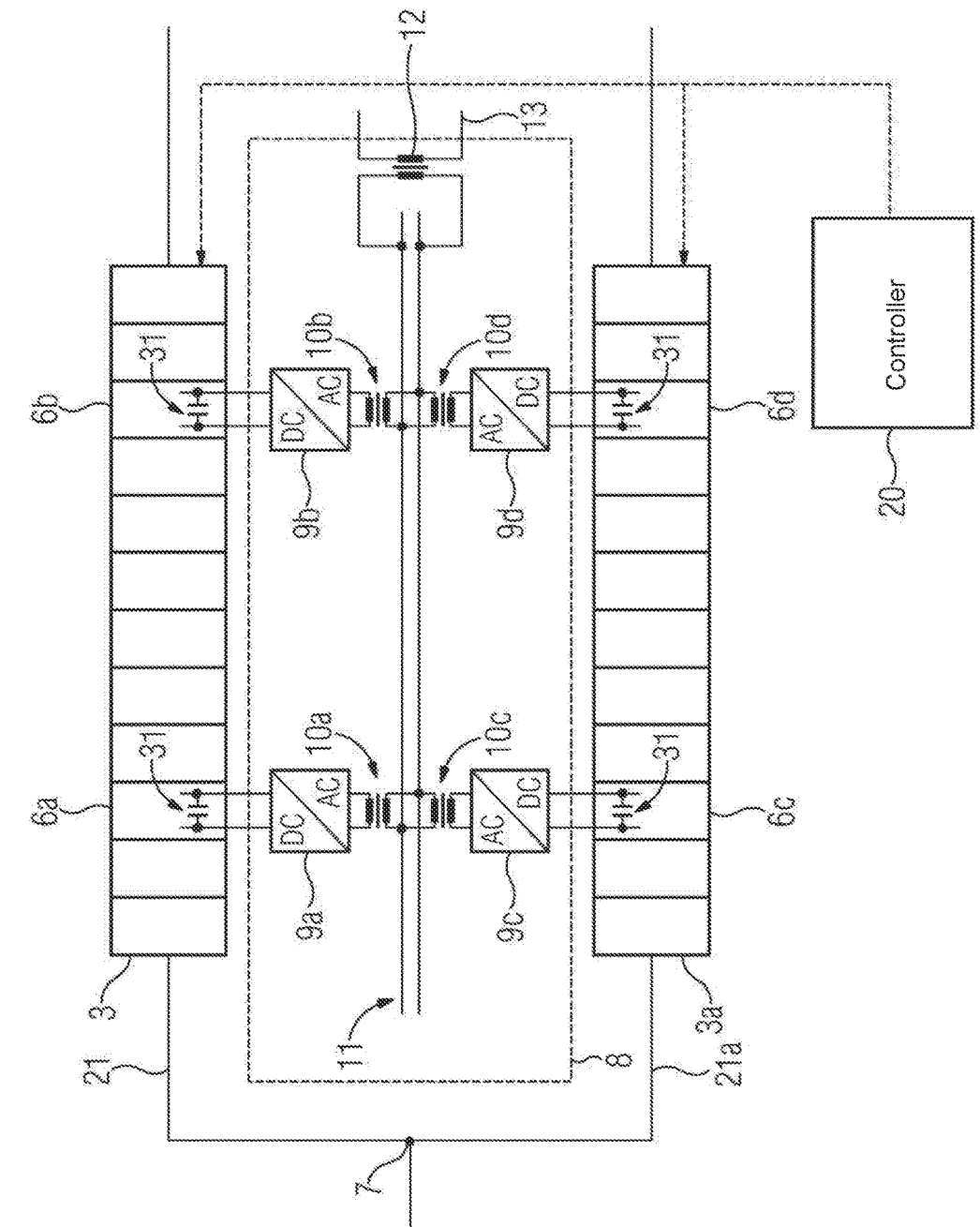
FIG. 3 shows a third embodiment example of the inventive device in schematic representation.

In detail, FIG. 1 shows an embodiment example of a device 1 for controlling a load flow in an alternating-voltage network 2. The alternating-voltage network 2 comprises a first, a second and a third phase line 21, 22, 23 and also a ground conductor 24. Phase voltages of over 100 kV drop between the phase lines 21, 22, 23. For instance, a phase voltage U23 between the second phase line 22 and the third phase line 23 amounts to 400 kV. Correspondingly, a differential voltage U3E of approximately 230 kV drops between the third phase line 23 and the earth conductor 24. All the phase voltages in the present case are alternating quantities.

A first modular series connection 3 has been serially inserted into the first phase line 21. The first modular series connection 3 in this case is of bipolar design, so that the entire phase current I21 also flows through the modular series connection 3.

The first modular series connection 3 comprises a series connection of bipolar switching modules 6 which in the present example all take the form of full-bridge circuits. The structure of the switching modules 6 will be considered in more detail in the following in connection with the elucidation of FIG. 6.

The device 1 further includes a second modular series connection 4, which has been inserted into the second phase line 22, and a third modular series connection 5, which has been inserted into the third phase line 23. The structure of the second and third modular series connections 4 and 5 in the present embodiment example resembles that of the first modular series connection 3.

The device 1 further includes a control device 20 that is suitable to drive the power-semiconductor switches of the switching modules 6. In this way, a switching-module voltage can be adjusted at the connectors of each switching module 6. Consequently, at the first modular series connection 3 a longitudinal voltage UL can be adjusted overall that corresponds to the sum of the switching-module voltages of the individual switching modules. In this connection it should be noted that in the representation shown in FIG. 1 the first modular series connection 3 exhibits twelve switching modules 6. However, the number of switching modules 6 is arbitrary in principle and may have been adapted to the respective application.

Corresponding remarks also apply to the second and the third modular series connection 4 and 5.

Since the switching modules 6 can be driven independently of one another, a longitudinal voltage UL of arbitrary waveform can be adjusted. In this way, very rapidly variable inductive and/or capacitive voltages for directly influencing the load flow can be fed into the alternating-voltage network 2. This is possible, in particular, also in series connection with transformers in the network and at outlets of switching stations.

FIG. 2 shows a second embodiment example of a device 1 according to the invention at a node 7 of an alternating-voltage network 2. For clarity, in FIGS. 1 and 2 identical or similar components and elements have been provided with the same reference symbols. This also applies, incidentally, to the representations shown in FIGS. 3 to 5.

At the node 7 the phase line 21 and an outgoing line 21a converge. The alternating-voltage network 2 shown in FIG. 2 is three-phase. For reasons of clarity, however, only the first phase of the alternating-voltage network 2 has been represented graphically.

The device 1 comprises a first modular series connection 3, which is serially arranged in the phase line 21, and also a further modular series connection 3a, which is serially arranged in the outgoing line 21a. The structure of the modular series connections 3 and 3a corresponds to the structure of the modular series connection 3 in FIG. 1.

According to the embodiment example represented in FIG. 2, the device 2 further includes an energy-exchange device 8. The energy-exchange device 8 is connected both to the first modular series connection 3 and to the further modular series connection 3a. By means of the energy-exchange device 8, energy can be exchanged between the phase line 21 and the outgoing line 21a. Hence active power can also be permanently fed into the phase line 21 or into the outgoing line 21a, and hence, for instance, differing drops in voltage in the phase line 21 or in the outgoing line 21a can be compensated.

A further embodiment example of the device 1 according to the invention is shown in FIG. 3. The first modular series connection 3 is connected to the further modular series connection 3a via an energy-exchange device 8. A first inverter 9a is linked parallel to an energy-storage device 31 of a first switching module 6a of the modular series connection 3. The first inverter 9a is accordingly connected on the direct-voltage side to the energy-storage device 31, and on the alternating-voltage side to a busbar 11 via a first transformer 10a.

A second switching module 6b of the modular series connection 3 is connected in similar manner to the busbar 11 via a second inverter 9b and second transformer 10b.

Correspondingly, a first switching module 6c and also a second switching module 6d of the further modular series connection 3a are also connected to the busbar 11 via inverters 9c and 9d and transformers 10c and 10d, respectively, assigned to them. The coupling of the inverters is effected in each instance parallel to the energy-storage devices 31 of the switching modules 6c and 6d.

The inverters 9a-d can accordingly withdraw energy from the energy-storage devices 31 and feed it into the busbar 11 as alternating voltage. Conversely, energy can also be transmitted from the busbar 11 into the energy-storage devices 31. In this case, the inverters 9a-d operate as rectifiers.

In the embodiment example shown in FIG. 3 only two switching modules 6a-d, in each instance, of the modular series connections 3, 3a are connected to the busbar 11. However, such connections including inverters and/or transformers may also have been assigned to some other, or even to all, switching modules of the modular series connections.

The busbar 11 is furthermore connected to an additional transformer 12, by means of which a further alternating-voltage network 13 is connected to the busbar in potential-separating manner. In this way, energy can likewise be exchanged between the further alternating-voltage network 13 and the alternating-voltage network 3.

Figure 4:
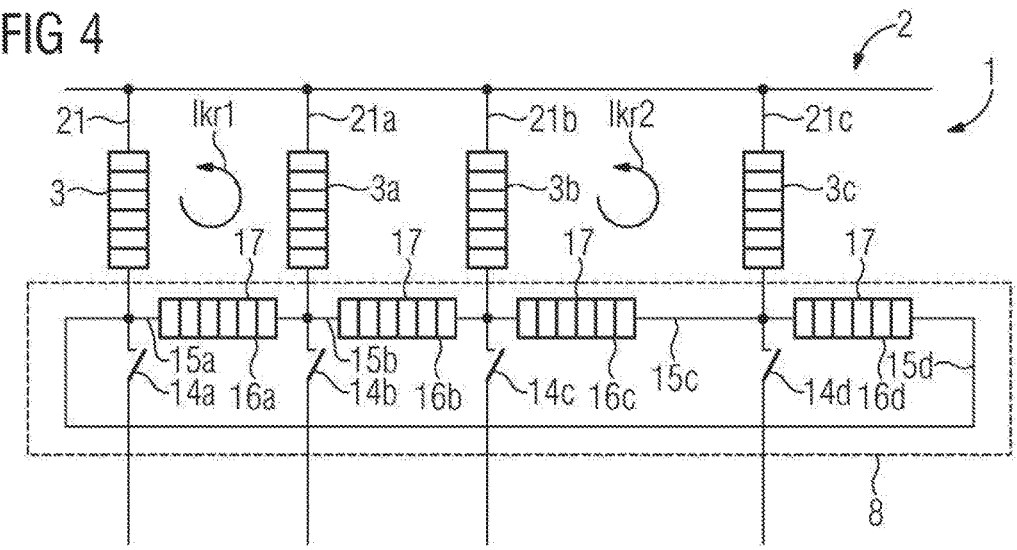
FIG. 4 shows a fourth embodiment example of the device according to the invention in schematic representation.

In FIG. 4, one phase of a polyphase alternating-voltage network 2 with a further embodiment example of the device 1 is represented. The alternating-voltage network 2 includes a phase line 21 and also a first, a second and a third additional outgoing line 21a, 21b and 21c, respectively. The alternating-voltage network 2 also includes further outgoing lines which, however, have not been represented graphically in FIG. 4.

The phase line 21 and also the outgoing lines 21a-c each exhibit a modular series connection 3 and 3a-c, respectively, which are all of similar construction to the modular series connection 3 shown in FIG. 1.

Furthermore, a switching element 14a-d is respectively assigned to the phase line 21 and to the outgoing lines 21a-c, by means of which the lines can be separated from one another.

The energy-exchange device 8 of the device 1 includes energy-exchange branches 15a-d between the phase line 21 and the additional outgoing lines 21a-c. In each of the connecting branches 15a-c a series connection 16a-d of exchange modules 17 is arranged, said exchange modules 17 being of similar structure to the switching modules 6.

The energy-exchange branches 15a-d form a ring structure. Hence they enable an exchange of energy between the phase line 21 and the outgoing lines 21a-c. By means of the modular series connections 3, 3a-c and also the series connections 16a-d of the exchange modules 17, circulating currents can be generated which ensure the exchange of the active power. For reasons of clarity, only two of the possible circulating currents are indicated graphically in FIG. 4: a first circulating current Ikr1, which can be generated in the mesh formed by the phase line 21, the first outgoing line 21a and also the first energy-exchange branch 15a, and also a second circulating current Ikr2, which can be generated in the mesh formed by the second outgoing line 21b, the third outgoing line 21c and also the third energy-exchange branch 15c.

Figure 5:
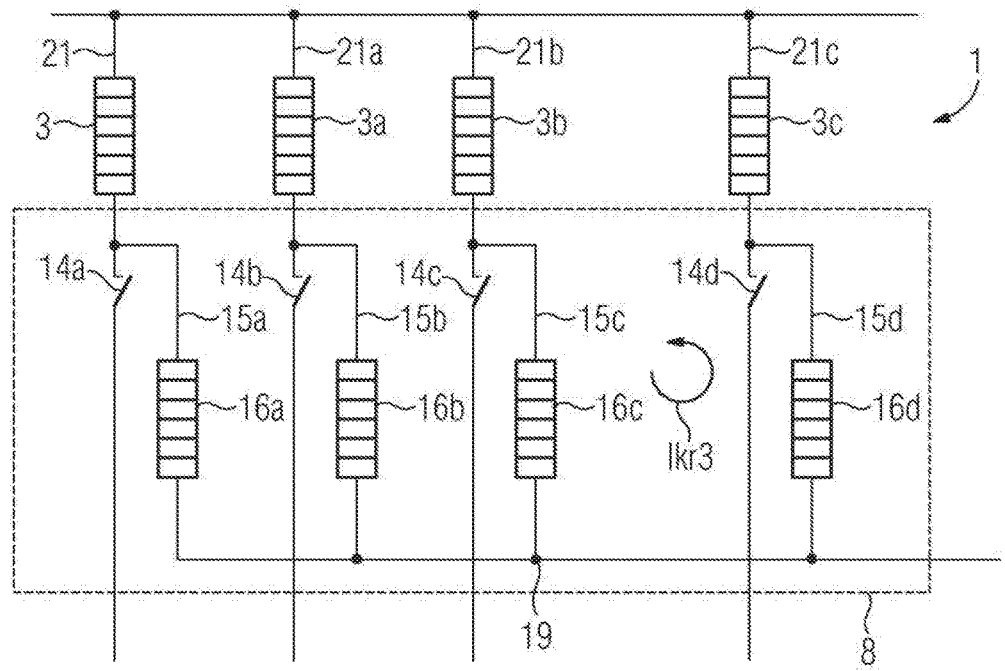
FIG. 5 shows a fifth embodiment example of the device according to the invention in schematic representation.

A next embodiment example of the device 1 according to the invention is represented in FIG. 5. The device 1 shown in FIG. 5 differs from the device 1 shown in FIG. 4 by virtue of the fact that the energy-exchange branches 15a-d in the embodiment example shown in FIG. 5 form a star structure. All the energy-exchange branches 15a-d coincide at a common star point 19. Here too, however, circulating currents can be generated that ensure the exchange of energy. For instance, a circulating current Ikr3 can be generated in the mesh formed by the second outgoing line 21b, the third energy-exchange branch 15c, the fourth energy-exchange branch 15d and the third outgoing line 21c.

Figure 6:
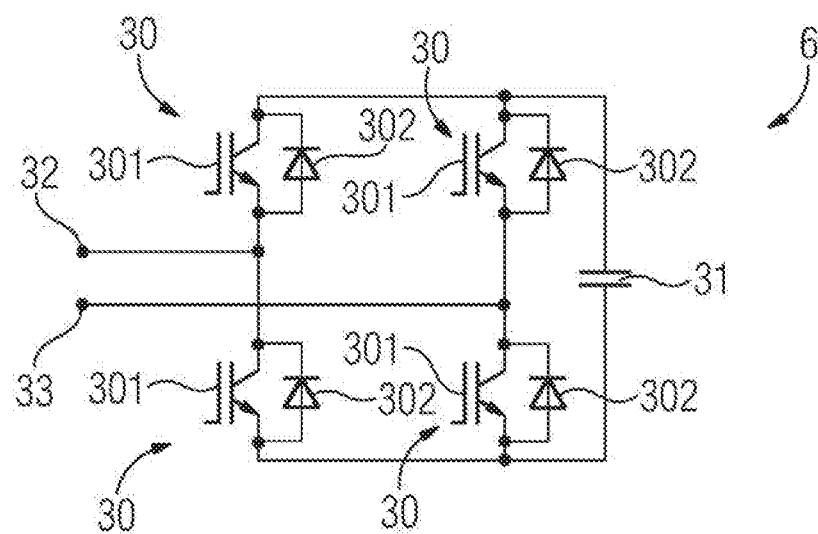
FIG. 6 shows an embodiment example of a switching module of the devices according to the invention shown in FIGS. 1 to 5, in schematic representation.

FIG. 6 shows the structure of the switching modules 6 of the devices 1 according to the invention shown in FIGS. 1 to 5. The switching modules 6a-d shown in FIG. 3 are of similar design thereto.

The switching module 6 takes the form of a full-bridge circuit. By an appropriate drive of the individual power semiconductors 301, energy can be supplied to or withdrawn from the power capacitor 31. In this way, at the connectors or poles 32 and 33 of the switching module 6 the voltage dropping at the energy-storage device, an oppositely-directed voltage, or even a zero voltage can be adjusted. With respect to further details of the structure and the mode of operation of the converter 3 and of the switching module 6, reference is hereby made to the aforementioned printed publication WO 2015/003737 A1.

The invention claimed is:

1. A device for controlling a load flow in an alternating-voltage network, the device comprising:
    a first modular series connection of bipolar switching modules serially inserted into a phase line of the alternating-voltage network, each of said bipolar switching modules having pole connectors, an energy-storage device and power semiconductors capable of being driven and capable of being switched on and off, and capable of being driven in such a manner that a switching-module voltage that corresponds to a positive or negative energy-storage voltage or to a voltage having a value zero can be generated at said pole connectors;
    a control device for driving said bipolar switching modules and being set up to drive said bipolar switching modules in such a manner that a periodic longitudinal voltage is generated at said modular series connection;
    a second modular series connection of said bipolar switching modules inserted into an outgoing line of the alternating-voltage network which is connected to the phase line, and by means of said second modular series connection a second longitudinal voltage can be generated;
    an energy-exchange device connected to said first modular series connection and to said second modular series connection and set up for an exchange of electrical energy between the phase line and the outgoing line;
    wherein said energy-exchange device includes a busbar and a first inverter connected on a direct-voltage side to said energy-storage device of one of said bipolar switching modules of said first modular series connection, and on an alternating-voltage side to said busbar, said energy-exchange device further includes a second inverter which is connected on a direct-voltage side to said energy-storage device of one of said bipolar switching modules of said second modular series connection, and on an alternating-voltage side to said busbar.

2. The device according to claim 1, wherein said energy-exchange device has a transformer and said first and said second inverters are respectively connected to said busbar via said transformer.

3. The device according to claim 1, wherein said energy-exchange device has an additional transformer and said busbar is connected to a further alternating-voltage network via said additional transformer.

4. The device according to claim 1, wherein said energy-exchange device includes at least one energy-exchange branch in which a series connection of energy-exchange modules is disposed, each of said energy-exchange modules has poles, an energy-storage device and power semiconductors that are capable of being driven and capable of being switched on and off, and is capable of being driven in such a manner that at said poles an exchange-module voltage can be generated that corresponds to the positive or negative energy-storage voltage or to the voltage having the value zero.

5. The device according to claim 1, wherein a plurality of additional modular series connections having said bipolar switching modules are disposed which can be respectively inserted into additional outgoing lines assigned to them and connected to the phase line, wherein said energy-exchange device is connected to said additional modular series connections and has been set up for an exchange of energy between the phase line, the outgoing line and the additional outgoing lines.

6. The device according to claim 5, wherein said energy-exchange device includes energy-exchange branches disposed between the phase line, the outgoing line and the additional outgoing lines, which form a ring structure.

7. The device according to claim 5, wherein said energy-exchange device includes energy-exchange branches between the phase line, the outgoing line and the additional outgoing lines, which form a star structure.

8. The device according to claim 1, wherein the device has been set up for controlling a load flow in a polyphase alternating-voltage network.

9. The device according to claim 1, wherein said bipolar switching modules take a form of full-bridge circuits.

10. The device according to claim 1, wherein said bipolar switching modules each take a form of two oppositely-directed half-bridge circuits.

11. A method for controlling a load flow in an alternating-voltage network, which comprises the steps of:
providing a first modular series connection of bipolar switching modules which has been inserted into a phase line of the alternating-voltage network, wherein each of the bipolar switching modules has poles, an energy-storage device and power semiconductors that are capable of being driven and capable of being switched on and off, and capable of being driven in such a manner that at the poles a switching-module voltage can be generated that corresponds to a positive or negative energy-storage voltage or to a voltage having a value zero;
providing a control device driving the bipolar switching modules in such a manner that a periodic longitudinal voltage is generated at the first modular series connection;
providing a second modular series connection having the bipolar switching modules and which has been inserted into an outgoing line of the alternating-voltage network which is connected to the phase line, and generating a second longitudinal voltage by the second modular series connection;
exchanging electrical energy between the phase line and the outgoing line by way of an energy-exchange device connected to the first modular series connection and to the second modular series connection;
wherein the energy-exchange device is provided a busbar and a first inverter connected on a direct-voltage side to the energy-storage device of one of the bipolar switching modules of the first modular series connection, and on an alternating-voltage side to the busbar, the energy-exchange device further includes a second inverter which is connected on a direct-voltage side to the energy-storage device of one of the bipolar switching modules of the second modular series connection, and on an alternating-voltage side to the busbar.

12. The method according to claim 11, which further comprises:
driving the bipolar switching modules of the second modular series connection by means of the control device in such a manner that a further longitudinal voltage is generated at the second modular series connection; and
exchanging electrical energy between the phase line and the outgoing line by means of an energy-exchange device connected to the first modular series connection and the second modular series connection.

* * * * *